United States Patent [19]

Arnett et al.

[11] 3,838,405

[45] Sept. 24, 1974

[54] NON-VOLATILE DIODE CROSS POINT MEMORY ARRAY

[75] Inventors: Patrick C. Arnett, Putnam Valley; Joseph J. Chang, Poughkeepsie, both of N.Y.

[73] Assignee: International Business Machines Corporation, Armonk, N.Y.

[22] Filed: Oct. 3, 1973

[21] Appl. No.: 402,956

[52] U.S. Cl. ............ 340/173 R, 307/238, 307/302, 317/235 R

[51] Int. Cl. ............ G11c 11/40

[58] Field of Search ......... 340/173 R; 307/238, 279, 307/281, 302; 317/235

[56] References Cited

UNITED STATES PATENTS

| | | | |
|---|---|---|---|
| 3,693,003 | 9/1972 | Sigsbee | 340/173 R |
| 3,797,000 | 3/1974 | Agusta | 317/235 R |

*Primary Examiner*—Terrell W. Fears
*Attorney, Agent, or Firm*—Francis J. Thornton

[57] ABSTRACT

A dense memory array in which every cross point of two insulated orthogonal sets of lines define a non-volatile memory device is described. Each device utilizes voltage and storage charge to control breakdown characteristics of a PN junction. Basically, the array comprises insulated metallic word lines orthogonal to bit line diffusions in a semiconductor body. The insulation between the word lines and the bit lines has dual charge states and can store charges. Biasing of the word and bit lines causes charges to be injected into the insulation to affect the surface field of the body and thus change the breakdown voltage of the diffusion with respect to the semiconductor body. Both the read and write operations involve voltage breakdown of the PN junction between the diffused bit line and the body. During the write operation, an avalanche breakdown of the junction is caused to occur and charge carriers are injected into the overlying insulator. The charge carriers so injected remain localized in the insulator immediately above the junction and therefore do not disturb the information on adjacent bit lines. To erase, a voltage is applied to cause the injected carriers to be driven out of the insulation into the substrate. Reading consists of sensing the breakdown voltage of the selected bit.

12 Claims, 4 Drawing Figures

NON-VOLATILE DIODE CROSS POINT MEMORY ARRAY

BACKGROUND OF THE INVENTION

1. Field of the Invention

This invention relates to semiconductor devices and more particularly to electronically non-volatile stored charge semiconductor structures, particularly adaptable for application to integrated circuit memory array structures.

DESCRIPTION OF THE PRIOR ART

Field effect transistors utilizing charges stored in dual insulators overlying the channel of the FET are known to the art. In these field effect transistors the basic gate dielectric structure of the FET is provided with a carrier trapping interface between a first insulator, usually an oxide, and a second insulator, usually a trapping material having a different insulating value. Silicon nitride and silicon dioxide dielectric materials are commonly employed in combination as the two insulators.

Such charge accumulation is due to the different conductivities of the layers and is retained at the interface between the layers when the applied voltage is removed because the current densities in the layers are non-linear functions of the electric field intensity.

Since the present invention relates particularly to diffused semiconductor structures utilizing metallic lines overlying the diffusion and insulated therefrom by a dual insulator structure, it should be mentioned that there are still other structures which are not field effect transistors that utilize dual insulators and diffusions in semiconductor bodies. For example, IBM Technical Disclosure Bulletin, Volume 12, No. 1. June, 1969, on Page 202, described a capacitive storage cell utilizing diffusions in a semiconductor body which diffusions are covered by metallic lines insulated from the diffusions by layers of silicon dioxide and silicon nitride. IBM Technical Disclosure Bulletin, Volume 14, No. 12, May, 1973, discloses a single diffusion metal-nitride-oxide semiconductor device which utilizes trapping in the oxide layer by causing the surface adjacent to the diffusion to be either inverted or non-inverted thus varying the capacitance of the diffusion. U.S. Pat. No. 3,446,995 teaches that the breakdown voltage of a junction diode can be varied by applying a suitable bias to an electrode overlying, but insulated from the junction. U.S. Pat. No. 3,428,875 teaches that the flatband voltage of an MOS capacitor can be precisely varied by placing two layers of different dielectric material between the body of the semiconductor material and the overlying gate electrode.

SUMMARY OF THE INVENTION

The present invention is directed toward a cross point memory cell capable of storing non-volatile information as charge in a charge storage medium such as a dual layered dielectric. The cell comprises a metal line disposed across a diffused line in a semiconductor body coated with dielectric layers having different conductivities. Selected voltages are used to write information into the cell by causing avalanche breakdown of the diffused PN junction to occur. This causes charge to be injected into the insulator immediately over the edge of the diffused line. This injected charge causes the PN junction breakdown voltage of the diffused line to be reduced. Different applied voltage can be used to erase the cell by removing these charges from the insulator.

The invention can be made in an array form and in this array form comprises a semiconductor body of one conductivity type having therein sets of diffused lines of opposite conductivity type material. A charge storage insulator of uniform thickness on the surface of the body over the diffused lines and a set of metallic lines disposed on the insulator orthogonal to the diffused lines, such that each crossing of a metallic line and a diffused line comprises a memory storage cell. The array has maximum packing density and maximum active cell area.

It is an object of the present invention to provide a non-volatile, random access array having a packing density presently unachievable by prior art devices.

It is another object of the present invention to provide a cross point memory cell composed of a metallic line, a diffused line, and a dual dielectric separating the lines.

It is also an object of the present invention to build such devices consistent with present state of the integrated circuit techniques.

It is a further object of the invention to describe a semiconductor memory array that will have a fast read and write capability, high transfer speed, high efficiency, and generally excellent performance characteristics.

DESCRIPTION OF THE DRAWINGS

These and other features and objects of the present invention will be more fully appreciated from the following detailed description of a preferred embodiment of the present invention taken in conjunction with the drawings in which.

DESCRIPTION OF THE INVENTION

Figure 1:
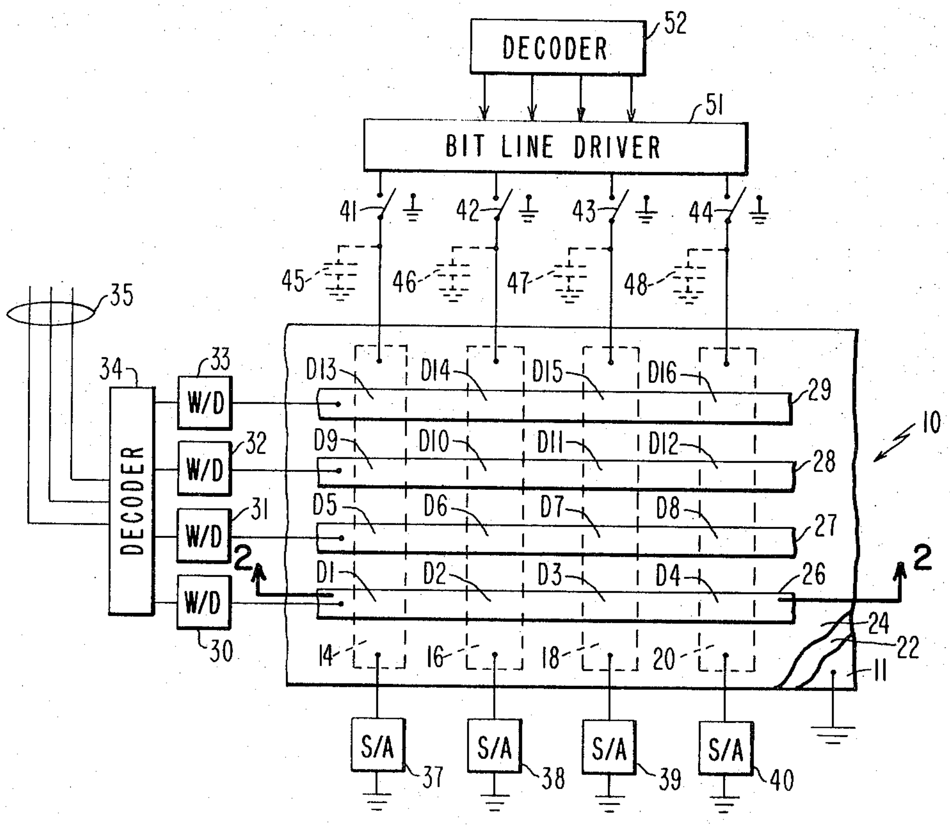
FIG. 1 is a plan view of an integrated form of a memory array formed in accordance with the present invention.

Illustrated in FIG. 1, is a memory array 10 in accordance with the present invention and is formed in a monocrystalline body of semiconductor material 11 such as n-type silicon having a resistivity of between 1 ohm centimeter and 2 ohm centimeter.

The array is produced by cleaning the uppermost surface 12 of the semiconductor body 11 and forming on surface 12, a 5,000 angstrom thick layer of silicon dioxide (not shown). This silicon dioxide layer can be produced by the so-called thermally grown process in which the semiconductor body is heated to about 1,000° C in a hydrogen atmosphere containing a small amount of oxygen. Following the establishment of this silicon dioxide layer, a layer of photoresist (not shown) is applied thereto and a mask provided thereover such that when the photoresist is exposed to light according to well-known techniques, elongated windows may be opened therein so that the underlying silicon dioxide layer can be etched and a series of elongated p-type bit sense lines 14, 16, 18, and 20 may be formed in the semiconductor body 12 by any suitable known diffusion process.

The sequence of steps and procedures needed to produce such diffused lines in a semiconductor body is well known in the semiconductor art and further details need not be given here.

Each diffused bit sense line 14, 16, 18, and 20 is diffused such that its resistivity reaches the preferred value of 10 ohm-centimeter per square. Each bit sense line 14, 16, 18, and 20 thus is separated from the body 11 by a respective rectifying junction 15, 17, 19, and 21. Thus each of these diffused bit sense lines will act with respect to the body 10 as the cathode of a diode. Preferably, for these described values, these bit sense lines must be spaced apart by no less then 2.5 microns.

Following the diffusion of these p-type bit lines 14, 16, 18, and 20, the upper most surface 12 of the body 11 is cleaned of the oxide layer and a layer 22 of silicon dioxide approximately 20 to 25 angstroms thick is formed thereon. This layer 22 may be thicker, for example, 100 angstroms, and may be produced by any suitable known so-called thermally grown process. Following the establishment of this silicon dioxoide layer 22, a silicon nitride layer 24 having a thickness of, say 500 angstroms, is formed on the layer 22. In practice, this layer 24 can range in thickness between 250 angstroms and 1,000 angstroms. One particular method of forming such a silicon nitride layer known to the semiconductor art comprises a treatment in which silane and ammonia are mixed in a carrier gas stream of hydrogen and introduced into a chamber containing the silicon body at a temperature of about 800° C. At this temperature a reaction occurs resulting in the formation of the silicon nitride layer 24 on the silicon dioxide layer 22. Following the creation of this silicon nitride layer 24 a deposit of metal such as aluminum about 8,000 angstroms thick is laid down on the surface of the silicon nitride layer 24. Such an aluminum layer may be created by any well-known process such as evaporation or by sputter deposition.

Once the aluminum layer has been laid down over the array, a photoresist mask (not shown) is provided over the surface of the aluminum and exposed and developed and the layer of aluminun etched in accordance with well-known techniques such that a series of metal work lines 26, 27, 28, and 29 are formed across the surface of the semiconductor body 11. Each of these work lines 26, 27, 28, and 29 are defined to cross each of the diffused bit lines 14, 16, 18, and 20. Each word line 26, 27, 28, and 29 is coupled to a respective word driver circuit 30, 31, 32, and 33, Each word driver circuit functions to provide selected voltages to the respective word line to which it is coupled. Each word driver circuit 30, 31, 32, and 33 is further coupled to a decoder circuit 34, which, in turn, is coupled to an address register (not shown) which provides a set of address signals to the decoder on lines 35.

The diffused bit lines 14, 16, 18, and 20 hereinafter referred to as bit sense lines, are coupled at one end to respective conventional, voltage sensitive, sense amplifiers 37, 38, 39, and 40 and at the other end thereto to respective switches 41, 42, 43, and 44. Each switch 41, 42, 43, and 44 is a three-position switch. The first position of each switch is connected to ground; the second position of each switch is connected through a bit line driver 51 to a decoder 52, so that selected voltages may be impressed upon the bit sense line by suitable decoded signals; and the third position of each switch is open, such that the bit sense line to which the switch is coupled can be isolated from both ground and the bit line driver; that is, left electrically floating.

To aid in the description of the array, the parasitic capacitance of each bit sense line 14, 16, 18, and 20 is shown as capacitors 45, 46, 47, and 48 respectively. The value of these parasitic capacitors of each of the described diffused bit sense lines is approximately 5 picofarads.

Each crossing of each metal work line 26, 27, 28, and 29 over a diffused bit sense line 14, 16, 18, and 20 defines a separate and distinct memory cell, D1 to D16. Thus, the array shown in FIG. 1 has sixteen distinct memory cells D1 to D16, one at each intersection of the word lines and the bit sense lines.

Figure 3:
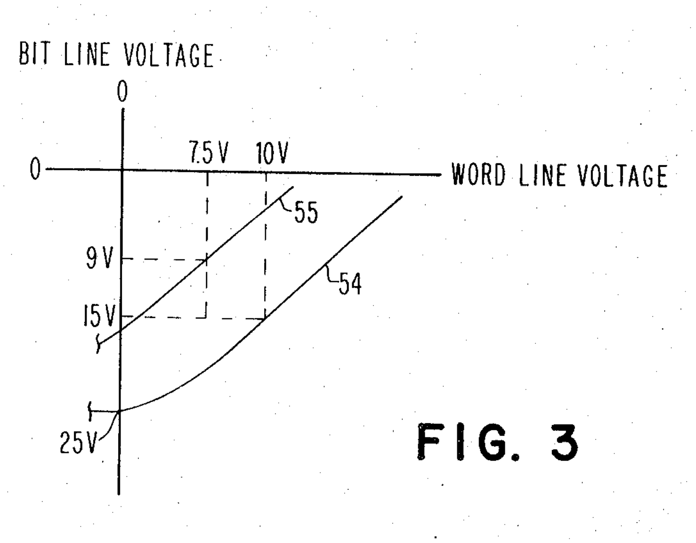
FIG. 3 shows the voltage current characteristics of a device of the present invention.

The normal breakdown of each rectifying junction 15, 16, 19, and 20 between the diffused bit lines and the semiconductor body 11 can be changed to a distinctive level by introducing charge into the dielectric interface between a selected bit sense line and a selected crossing word line. This introducing of charge into the dielectric over the diffused bit line and under the metallic line writes the cell defined by the intersection of the lines by modifying the breakdown voltage of the cell. Typical voltage curves of such a cross point cell for the high and low breakdown states of such cells is shown in FIG. 3. Curve 54 of FIG. 3 illustrates the breakdown voltage of a rectifying junction of the described embodiment of the invention when no charge in the dielectric interface between the bit sense line and the respective word line. In this case, the maximum voltage the rectifying junction can sustain in a reversed bias condition is approximately −25 volts. When charge is stored in the interface, the breakdown voltage of the junction becomes reduced to approximately −16 volts as indicated, in FIG. 3, by curve 55.

The introducing of charge into the interface is deemed to be write operation and is accomplished by driving the rectifying junction at the crossing of the work and bit sense line into an avalanche condition so that highly energetic charges such as hot electrons are injected from the avalanched junction into the dielectric interface. These carriers are only injected into the dielectric interface immediately above the point of junction breakdown and do not migrate therefrom. Thus, each cell can have its breakdown voltage set to a distinctive high or low breakdown state without affecting any adjacent cell on either the same word line or the same bit line.

Reading of a cell so written consists of biasing the intersecting bit sense line and a word line defining the cell at voltage levels such that the cell is biased at a level higher than the low breakdown level of the junction but lower than the high breakdown level. By limiting the current through the junction during the read operation, the stored charge is not disturbed and remains in the state in which it was written until it is positively erased.

Erasing of the cell consists of biasing the intersecting word and bit line such that the stored charges in the cell are driven from the interface back into the body 11.

Figure 4:
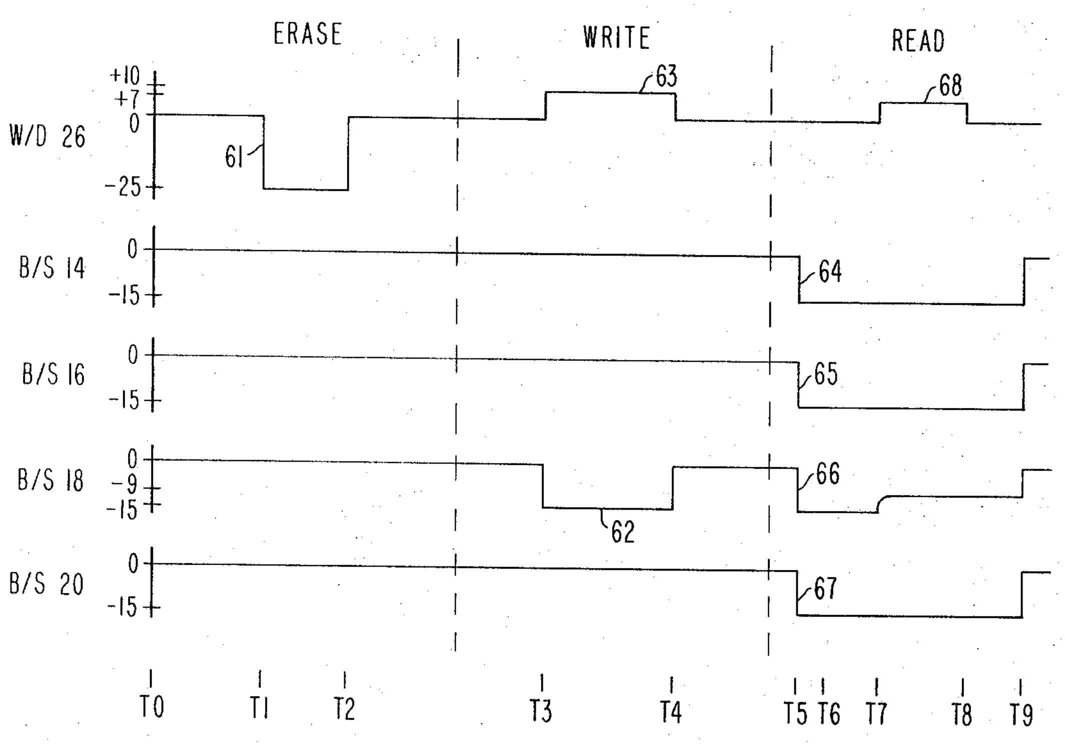
FIG. 4 shows the read, write, and erase waveforms associated with the memory array of FIG. 1.

In describing the operation of the array shown in FIG. 1, it will be assumed for purposes of illustration only that the high breakdown state of the PN junction; i.e., when no charge is stored in the interface, will represent a binary zero and the low breakdown state of the PN junction; i.e., when charge is stored in the interface, will represent a binary "1." In the following specific example, only a single work line 26 will be used to illustrate the erase, write, and read operations of the array. Initially, the four cells D1, D2, D3, and D4 formed by the crossing of word line 26 over the four bit sense lines 14, 16, 18, and 20 are erased; that is, the dielectric interface of each is made free of charge and each will exhibit with respect to word line 26 a high breakdown state. To erase these cells D1, D2, D3, and D4, at time T0, as shown in FIG. 4, the switches 41, 42, 43, and 44 are set as to connect the bit sense lines 14, 16, 18, and 20 to ground; that is, a zero voltage condition. The substrate 11 is also connected to ground. At time T1, pulses are provided on address input signal lines 35 to cause word line 26 to be biased at −25 volts by its respective word line driver 30. This is shown as pulse 61 in FIG. 4. The remainder of the word lines 27, 28, and 29 are held at zero volts by their respective word line drivers which are not activated. The application of this −25 volt pulse to word line 26 assures that no charge remains in the dual insulation layers 22 and 24 positioned between the word line 26 and the underlying diffused bit sense lines 14, 16, 18, and 20. Thus, each of the cells, D1, D2, D3, and D4 are set into the high breakdown state and thus each will represent a binary "0." After a suitable period of time this erase pulse 61 is terminated at time T2.

Figure 2:
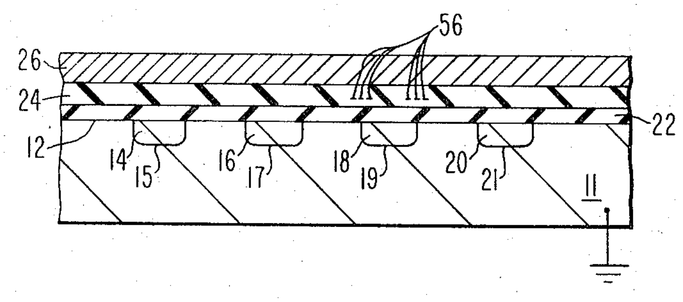
FIG. 2 is a sectional view of the integrated array shown in FIG. 1 taken along the line 2—2.

It will now be assumed that charge is to be inserted under the word line 26 and over the bit sense line 18 such that the cell D3 formed by the intersection of these two lines, will be set into a low breakdown state such as to represent a binary "1." To write this cell, D3, the bit sense lines 14, 16, and 20 are left connected through switches 41, 42, and 44 to ground and the remaining bit sense line 18 is connected through switch 43 to the bit line driver 51 which, at time T3, is driven such as to apply a −15 volt pulse 62 to bit line 18. The substrate 11 remains at ground. Simulatneously, at time T3, a +10 volt pulse 63, is applied to work line 26 by the word driver circuit 30. The other word lines are not biased and remain at zero volts. The simultaneous application of the pulses 62 and 63 to the bit sense line 18 and the word line 26, respectively, causes avalanche breakdown of the rectifying junction 19 immediately under line 26. This avalanche breakdown of junction 19 causes high energy electrons generated at the intersection of the junction 19 and the surface 12 below the word line 26 to be driven, by the applied fields, through the thin dioxide layer 22 overlying the surface 12 into the interface of the silicon dioxide layer 22 and the silicon nitride layer 24, under the word line 26 and over the bit sense line 18. The charges so injected are indicated in FIG. 2 by numeral "56." These charges 56 so introduced remain positioned over the junction 19 under the word line 26 for usefully long periods of time since no paths are available to discharge these accumulated injected electrons unless the selected high level erase voltages are applied to the word line 26. Because these electrons are injected immediately over the junction and immediately under word line 26, only cell D3 is affected and no other cell in the entire array would be affected by these applied voltages.

Following the injection of these charges 56, into the dielectric interface under line 26 and above the junction 19, the breakdown voltage of the junction 19 in the vicinity of the word line 26; i.e., cell D3, is reduced to approximately −16 volts.

Charge becomes introduced into the insulator interface only in the region of cell D3 because only this portion of junction 19 experiences −25 volts across it, which voltage is sufficient to cause the junction at this point to go into avalanches breakdown, which cause charges to be avalanche injected into the dielectric above the breakdown.

The remainder of the cells D1, D2, and D4 to D16 are not written into either because, for example, the bit lines 14, 16, and 18 are at ground, or because the word lines 27, 28, and 29 are at ground. Thus, no other cell goes into avalanche breakdown.

In order to use this write scheme without intentionally changing the state of adjacent memory devices in the array, it is preferable that all the voltages in the array track one another to within a few volts of one another. Thus, at time T4, both pulses 62 and 63 are terminated and all word lines and bit sense lines are reduced to zero.

After the selected cell D3 has been written into; that is, set into the low voltage breakdown state, it can thereafter be read non-destructively. Each of the other cells in the array can also be set into a binary "0" state by following the above described procedures with the proper selected work lines and diffused bit sense lines.

Reading of the array is a two-phase operation. Again, for purposes of illustration, attention will remain on word line 26 and the cells D1, D2, D3, and D4, existing at the intersections of bit lines 14, 16, 18, and 20 and under word line 26. To read these cells D1, D2, D3, and D4, all the word lines are held at zero volts and the bit lines 14, 16, 18, and 20 are coupled through switches 41, 42, 43, and 44 to the bit line driver 51. At time T5, a 15 volt pulse is applied by the bit line driver to each of the bit lines. This causes each of the respective sense amplifiers to record a 15 volt pulse indicated in FIG. 4 as pulses 64, 65, 66, and 67. The application of this 15 volt pulse causes the parasitic capacitances 45, 46, 47, and 48 coupled to the respective bit lines 14, 16, 18, and 20 to be charged to a 15 volt level. At some time T6, approximately 10 microseconds after the application of the 15 volt pulse to the diffused bit lines, the switches 41, 42, 43, and 44 are opened such that the bit lines 14, 16, 18, and 20 are isolated from both the bit line driver 51 and from ground; that is, they are floating. Sometime later, at time T7, approximately 30 microseconds after the opening of the switches, the word line 26 is raised to +7.5 volts as indicated by pulse 68. The application of this +7.5 volt pulse 18 to the word line 26 causes a total voltage of 22.5 volts to be impressed upon each of the cells D1, D2, D3, and D4. The remaining cells D5 to D16, in the array only see the 15 volts applied to each of the diffused bit sense lines. This total applied voltage of 22.5 volts now applied to each of these cells D1, D2, D3, and D4 is such that any of the cells D1, D2, D3, and D4 in the low breakdown state will have its breakdown voltage exceeded and will begin to conduct current while those devices which are in the high breakdown state will not have their voltages exceeded and will not conduct current. In the given example, only the cell D3, existing at the intersection between the diffused bit line 18 and the overlying word line 26, has been set into a low breakdown state. Thus, only the junction 19 breakdown causes the previously applied voltage stored on the line 18 to be reduced to approximately 9 volts as indicated by the charge in curve 66 at time T7. Thus, the parasitic capacitance 47 is partially discharged from 15 volts to about 9 volts. The other word lines remain in the high voltage condition; i.e., the capacitors 45, 46, and 48 remain at 15 volts since breakdown voltage of the junctions 15, 17, and 21 is not exceeded. At time T8, the +7.5 volt pulse 68 applied to the word line 26 by driver 30 is terminated and at some following time, T9, the bit lines 14, 16, 18, and 20 are all connected to ground and the parasitic capacitances 45, 46, 47, and 48 totally discharged.

In a similar manner, the cells associated with the other word lines 27, 28, and 29 can also be read.

While the invention has been particularly shown and described with reference to the preferred embodiment hereof, it should be understood by those skilled in the art that it is obvious that opposite type materials and opposite voltage pulses from that shown in the preferred embodiment can be used and that these various changes in form and detail of the apparatus and method may be made without departing from the spirit and scope of the invention and that the methods described to produce the device are in no way restricted by the apparatus.

What is claimed is:

1. A non-volatile memory storage device comprising,

- a body of semiconductor material,
- a diffusion in said body, defining a rectifying junction with said body,
- said junction having an initial breakdown voltage,
- a charge storage medium on the surface of said body and over said diffusion,
- an electrode disposed on said medium over said diffusion,
- means for biasing said diffusion with respect to said body to avalanche breakdown said junction and generate charge carriers, and
- means for biasing said electrode with respect to said body to accumulate charge carriers from said avalanche breakdown in said medium to alter the initial breakdown voltage of the junction.

2. The device of claim 1 wherein there is further provided means for determining the altered breakdown voltage of the junction.

3. The device of claim 2 wherein there is further provided means for biasing said electrode to remove said charge carriers from said medium and restore the breakdown voltage of the junction to its initial state.

4. The device of claim 3 wherein said body is silicon and said medium comprises layers of first and second dielectric materials.

5. The device of claim 4 wherein said first dielectric layer is silicon dioxide and in contact with said body and said second dielectric is silicon nitride and in contact with said first dielectric layer and said electrode.

6. The device of claim 5 wherein said charge storage medium comprises a layer of silicon dioxide between 20 and 100 angstroms in thickness and a layer of silicon nitride between 250 and 1,000 angstroms in thickness.

7. The device of claim 6 wherein there is further provided a second conductive electrode disposed on said medium adjacent said first electrode and over said diffusion, and

- means for biasing said second electrode with respect to said body.

8. The device of claim 1 wherein said biasing means for said diffusion comprises an address decoder and a driver circuit coupled to said diffusion.

9. The device of claim 2 wherein said means for determining the breakdown voltage of said junction comprises a voltage sensitive sense amplifier coupled to said diffusion.

10. The device of claim 1 wherein said means for biasing said electrode comprises an address decoder and a driver circuit coupled to said electrode.

11. A non-volatile memory storage array comprising,

- a body of semiconductor material,
- a series of adjacent parallel diffused regions in said body, each region defining a rectifying junction with said body,
- said junction having a initial breakdown voltage,
- a charge storage medium on the surface of said body over said regions,
- a series of spaced apart electrodes disposed on said medium over said regions,
- the intersection of each line with each region defining an active cell area,
- first voltage means for selectively biasing a selected one of said regions with respect to said body to avalanche breakdown the junction between the selected region and the body, and generate charge carriers,
- second voltage means for selectively biasing a selected one of said electrodes, with respect to said body to accumulate said charge carriers in said medium and under said selected electrode in the cell area defined by the intersection of the selected region and the selected electrode to alter the breakdown voltage of said junction in said cell area,
- decoupling means coupled between said means for biasing said diffusion to decouple said diffusion from said biasing means and leave said diffusion electrically floating,
- sensing means coupled to said regions for determining the breakdown voltage of the junction in said cell area, and
- third voltage means for biasing said selected electrode with respect to said body to remove charge carriers from said medium in said cell area.

12. A solid state storage device comprising a body of semiconductor material of a first conductivity type,

- a region in said body of opposite conductivity type defining a rectifying junction with said body,
- said junction extending to and intersecting the surface of said body,
- a charge storage medium on said surface over the intersection of said junction with said surface,
- conductive means overlying said medium and overlying the intersection of said junction with said surface,
- first voltage means for biasing said junction to cause an avalanche breakdown of said junction,
- second voltage means for biasing said conductive means to accumulate charge carriers from said avalanche breakdown of said junction in said medium to alter the breakdown voltage of said junction, and
- means for determining the altered breakdown voltage of said junction.

* * * * *